(12) United States Patent
Mori et al.

(10) Patent No.: US 9,644,760 B2
(45) Date of Patent: May 9, 2017

(54) DAMPING VALVE

(71) Applicant: KAYABA INDUSTRY CO., LTD., Tokyo (JP)

(72) Inventors: Toshihiro Mori, Aichi (JP); Ryosuke Kamakura, Aichi (JP); Shinichi Hagidaira, Gifu (JP)

(73) Assignee: KYB Corporation, Tokyo (JP)

( * ) Notice: Subject to any disclaimer, the term of this patent is extended or adjusted under 35 U.S.C. 154(b) by 70 days.

(21) Appl. No.: 14/775,081

(22) PCT Filed: Mar. 12, 2014

(86) PCT No.: PCT/JP2014/056547
§ 371 (c)(1),
(2) Date: Sep. 11, 2015

(87) PCT Pub. No.: WO2014/142191
PCT Pub. Date: Sep. 18, 2014

(65) Prior Publication Data
US 2016/0025237 A1    Jan. 28, 2016

(30) Foreign Application Priority Data

Mar. 13, 2013  (JP) ................................. 2013-050137

(51) Int. Cl.
*F16K 31/10* (2006.01)
*F16K 31/06* (2006.01)
(Continued)

(52) U.S. Cl.
CPC ............ *F16K 31/0655* (2013.01); *F16F 9/34* (2013.01); *F16F 9/464* (2013.01); *F16F 9/465* (2013.01);
(Continued)

(58) Field of Classification Search
CPC .......... F16K 31/0655; F16K 1/36; F16K 1/42; F16K 27/029; F16K 31/40; F16K 25/00;
(Continued)

(56) References Cited

U.S. PATENT DOCUMENTS 4,785,920 A * 11/1988 Knecht ...................... F16F 9/46
251/129.05
5,163,706 A * 11/1992 Maguran, Jr. ........... F16F 9/465
137/854

(Continued)

FOREIGN PATENT DOCUMENTS

JP    2009-222136 A    10/2009
WO  WO 2006-135319 A1  12/2006

*Primary Examiner* — John Bastianelli
(74) *Attorney, Agent, or Firm* — Rabin & Berdo, P.C.

(57) ABSTRACT

A damping valve includes a valve seat member, a valve body, a back-pressure chamber, a pilot passage, and a pilot valve, wherein the pilot valve has a pilot valve seat member and a pilot valve body, the pilot valve seat member having an cylindrical valve container provided with a penetrating hole connecting the inside and the outside, the penetrating hole communicating with the port, and an annular pilot valve seat provided in an end of the valve container, and the pilot valve body having a large diameter portion, a small diameter portion slidably inserted into the valve container, and a concave portion provided between the large diameter portion and the small diameter portion to face the penetrating hole, and an end of the large diameter portion is seated on or unseated from the pilot valve seat to open or close the pilot passage.

12 Claims, 8 Drawing Sheets

(51) Int. Cl.
*F16K 31/40* (2006.01)
*F16K 25/00* (2006.01)
*F16F 9/46* (2006.01)
*F16F 9/34* (2006.01)
*F16K 1/36* (2006.01)
*F16K 1/42* (2006.01)
*F16K 27/02* (2006.01)

(52) U.S. Cl.
CPC .............. *F16K 1/36* (2013.01); *F16K 1/42* (2013.01); *F16K 25/00* (2013.01); *F16K 27/029* (2013.01); *F16K 31/40* (2013.01); *Y10T 137/789* (2015.04)

(58) Field of Classification Search
CPC ... F16F 9/464; F16F 9/34; F16F 9/465; Y10T 137/7888–137/7893
USPC ............ 251/14, 30.01–30.05, 129.15, 129.2, 251/332–334, 337; 137/852–857
See application file for complete search history.

(56) References Cited

U.S. PATENT DOCUMENTS

| | | | | |
|---|---|---|---|---|
| 5,261,448 A | * | 11/1993 | Furuya | B60G 17/08 137/513.5 |
| 5,282,645 A | * | 2/1994 | Spakowski | F16F 9/46 251/30.02 |
| 5,449,055 A | | 9/1995 | Geiling et al. | |
| 2008/0006493 A1 | * | 1/2008 | Jee | F16F 9/348 251/129.17 |
| 2008/0185246 A1 | * | 8/2008 | Park | F16F 9/465 188/322.15 |
| 2008/0190719 A1 | * | 8/2008 | Jee | F16F 9/3207 251/129.15 |
| 2009/0200125 A1 | | 8/2009 | Sonsterod | |
| 2010/0001217 A1 | * | 1/2010 | Jee | F16F 9/463 251/129.15 |
| 2010/0006383 A1 | * | 1/2010 | Jee | F16F 9/325 188/322.13 |

* cited by examiner

DAMPING VALVE

TECHNICAL FIELD

This invention relates to a damping valve.

BACKGROUND ART

There is known a type of damping valve, called a variable damping valve, capable of changing a damping force of a shock absorber interposed between a chassis and an axle of a vehicle. Such a type of damping valve includes, for example, an annular valve seat provided in the middle of a flow path connected from a cylinder of the shock absorber to a reservoir, a valve body seated on or unseated from the annular valve seat to open or close the flow path, a pilot passage branching from the flow path, an orifice provided in the middle of the pilot passage, a tubular spool abutting on a side of the valve body opposite to the valve seat, a valve housing having an outer circumference where the spool is slidably mounted and forming a back-pressure chamber in a rear side of the valve body along with the spool, a pilot valve provided downstream of the pilot passage, and a solenoid for adjusting a valve opening pressure of the pilot valve. In the variable damping valve, a secondary pressure downstream from the orifice in the pilot passage is introduced into the back-pressure chamber to press the valve body.

In the damping valve described above, since the pilot valve is provided downstream from the back-pressure chamber, the secondary pressure guided to the back-pressure chamber is controlled by the valve opening pressure of the pilot valve by adjusting the valve opening pressure of the pilot valve using a thrust force of the solenoid.

As described above, the secondary pressure is applied to the rear face of the valve body, so that the valve body is pressed to the valve seat side. A pressure upstream of the flow path is applied to the front face of the valve body by flexing the valve body to unseat it from the valve seat. Therefore, if the force of unseating the valve body from the valve seat caused by the pressure upstream of the flow path exceeds the force of pressing the valve body to the valve seat caused by the secondary pressure, the valve body is opened.

That is, it is possible to adjust the valve opening pressure of the valve body by controlling the secondary pressure. In addition, it is possible to change resistance applied from the damping valve to a flow of the hydraulic oil passing through the flow path by adjusting the valve opening pressure of the pilot valve using the solenoid. Therefore, it is possible to generate a desired damping force in the shock absorber (for example, see JP 2009-222136 A).

SUMMARY OF INVENTION

In the damping valve described above, the damping force is adjusted by controlling the valve opening pressure of the pilot valve. The pilot valve is just a poppet valve for opening or closing the port, and the valve body receives an inertial force when the pilot valve is opened. For this reason, a distance between the valve body and the valve seat is once dynamically overshot from the statically balanced position in which the thrust force of the solenoid, the biasing force of the coil spring for biasing the valve body, and the force of pressing the valve body by virtue of the pressure upstream of the pilot valve are statically balanced. Then, the position of the valve body is displaced over the statically balanced position and is converged to a balanced position.

That is, in the damping valve described, a long time is necessary until the valve body is stabilized in the statically balanced position after the pilot valve is opened as indicated by the dotted line in FIG. 5. Accordingly, it takes time until the generated damping force is stabilized.

Such a problem may be addressed by increasing the area of the flow path relative to the valve opening level of the pilot valve. However, in the damping valve of the prior art, since the pilot valve is the poppet valve, it is necessary to enlarge a diameter of the annular valve seat where the poppet valve is seated or unseated in order to increase the area of the flow path. In this case, since an area of the pressure applied to unseat the poppet valve from the valve seat increases, it is necessary that the solenoid output a strong thrust force. This increases the size of the damping valve disadvantageously.

In view of the aforementioned problems, it is therefore an object of this invention to provide a damping valve capable of exerting a stable damping force without increasing the size.

According to one aspect of the present invention, a damping valve includes a valve seat member provided with a port, a valve body that opens or closes the port, a back-pressure chamber configured to bias the valve body toward the valve seat member using an internal pressure, a pilot passage configured to reduce a pressure upstream of the port and guide the pressure into the back-pressure chamber, and a pilot valve provided in the middle of the pilot passage, the pilot valve being configured to control the internal pressure of the back-pressure chamber, wherein the pilot valve has a pilot valve seat member and a pilot valve body, the pilot valve seat member having an cylindrical valve container provided with a penetrating hole connecting the inside and the outside, the penetrating hole communicating with the port, and an annular pilot valve seat provided in an end of the valve container, and the pilot valve body having a large diameter portion, a small diameter portion slidably inserted into the valve container, and a concave portion provided between the large diameter portion and the small diameter portion to face the penetrating hole, and an end of the large diameter portion is seated on or unseated from the pilot valve seat to open or close the pilot passage.

DESCRIPTION OF EMBODIMENTS

A description will now be made for embodiments of this invention with reference to the accompanying drawings.

Figure 1:
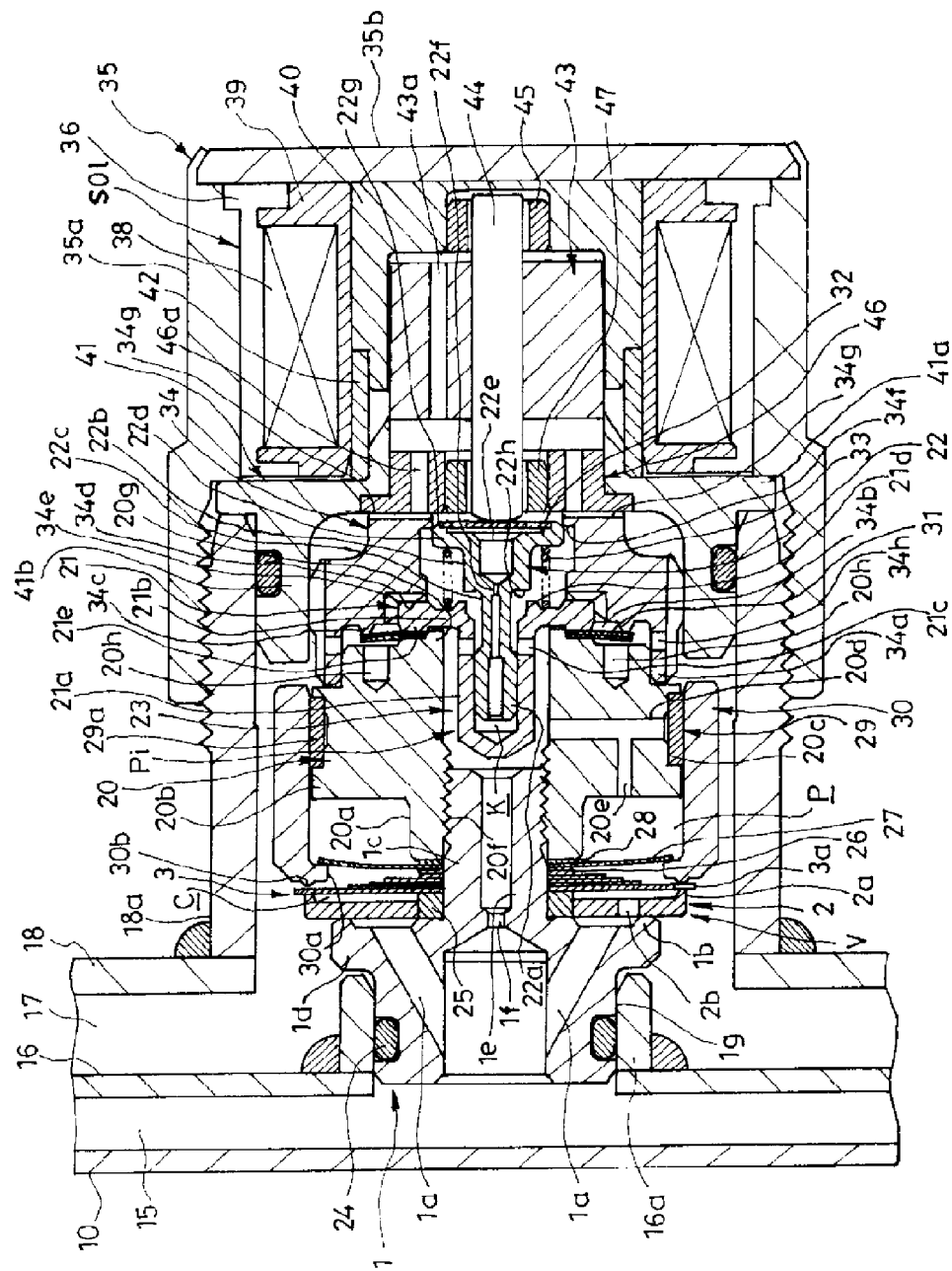
FIG. 1 is a cross-sectional view illustrating a damping valve according to an embodiment of this invention.

Referring to FIG. 1, a damping valve V includes a valve seat member 1 having a port 1a, a valve body 3 for opening or closing the port 1a, a tubular spool 30 abutting on a side of the valve body 3 opposite to the valve seat member 1, a valve housing 20 serving as a spool holding member and having an outer circumference where the spool 30 is mounted movably along an axial direction, a back-pressure chamber P partitioned by the spool 30 and the valve housing 20 to bias the spool 30 such that the valve body 3 is pressed toward the valve seat member 1 with an internal pressure, and a ring 29 mounted to the outer circumference of the valve housing 20 to make sliding contact with an inner circumference of the spool 30.

The damping valve V is installed in a shock absorber S. The shock absorber S is generally designed to generate a damping force by applying resistance to a fluid passing through the port 1a in the course of expansion or contraction.

Figure 2:
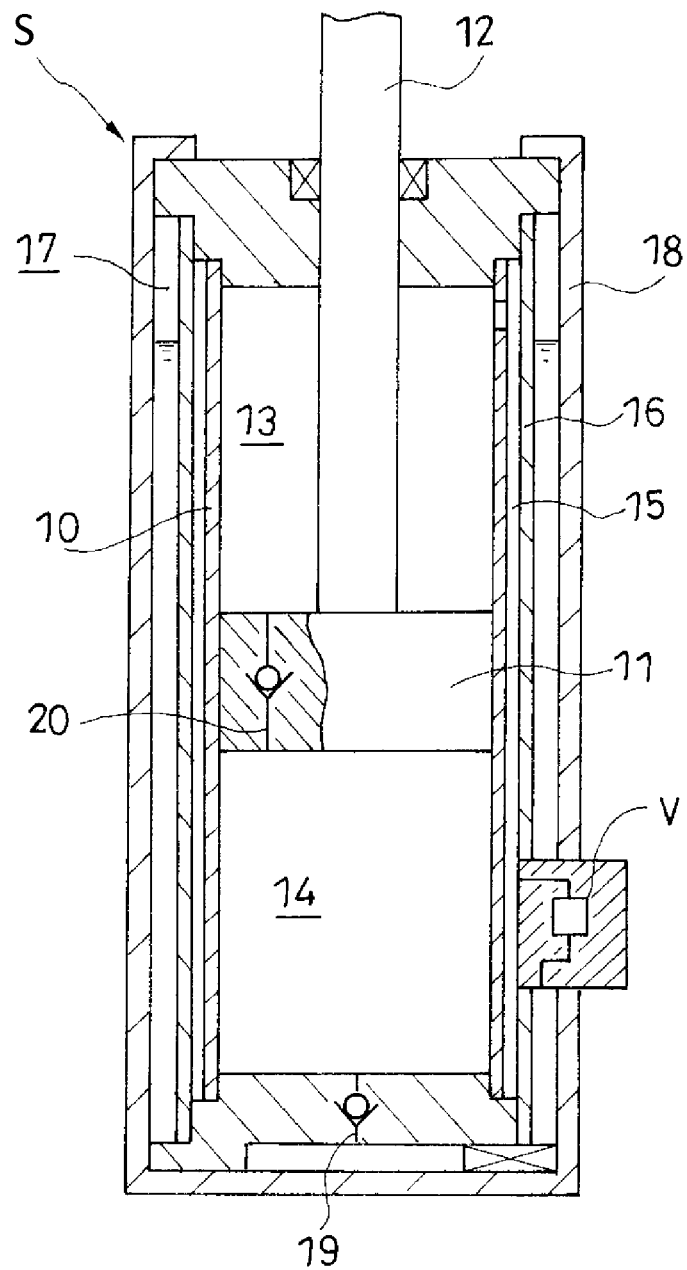
FIG. 2 is a cross-sectional view illustrating a shock absorber provided with the damping valve according to an embodiment of this invention.

Referring to FIG. 2, the shock absorber S installed with the damping valve V includes, for example, a cylinder 10, a piston 11 slidably inserted into the cylinder 10, a rod 12 retractably inserted into the cylinder 10 and connected to the piston 11, a rod-side chamber 13 and a piston-side chamber 14 partitioned by the piston 11 inserted into the cylinder 10, an intermediate tube 16 that covers an outer circumference of the cylinder 10 to form a discharge passage 15 along with the cylinder 10, and an outer tube 18 that covers an outer circumference of the intermediate tube 16 to form a reservoir 17 along with the intermediate tube 16. Hydraulic oil as a hydraulic fluid is filled in the rod-side chamber 13, the piston-side chamber 14, and the reservoir 17. The reservoir 17 is also filled with gas in addition to the hydraulic oil. As the hydraulic fluid, any fluid capable of exerting a damping force may be employed instead of the hydraulic oil.

The shock absorber S includes an inlet channel 19 that allows only for a flow of the hydraulic oil directed from the reservoir 17 to the piston-side chamber 14, and a piston passage 20 provided in the piston 12 to allow only for a flow of the hydraulic oil directed from the piston-side chamber 14 to the rod-side chamber 13. The discharge passage 15 causes the rod-side chamber 13 and the reservoir 17 to communicate with each other, and the damping valve V is provided in the middle of the discharge passage 15.

When the shock absorber S is operated to contract, the piston 11 moves downward in FIG. 2, so that the piston-side chamber 14 is compressed, and the hydraulic oil inside the piston-side chamber 14 moves to the rod-side chamber 13 through the piston passage 20. In this case, since the rod 12 intrudes into the cylinder 10, the hydraulic oil becomes excessive inside the cylinder 10 as much as a volume of the intruding rod, and the excessive hydraulic oil is extruded from the cylinder 10 and is discharged to the reservoir 17 through the discharge passage 15. The shock absorber S exerts a contractive damping force by applying resistance to a flow of the hydraulic oil moving to the reservoir 17 through the discharge passage 15 using the damping valve V to increase an internal pressure of the cylinder 10.

When the shock absorber S is operated to expand, the piston 11 moves upward in FIG. 2, so that the rod-side chamber 13 is compressed, and the hydraulic oil inside the rod-side chamber 13 moves to the reservoir 17 through the discharge passage 15. In this case, the piston 11 moves upward, and the volume of the piston-side chamber 14 increases, so that the hydraulic oil corresponding to this increasing volume is supplied from the reservoir 17 through the inlet channel 19. The shock absorber S exerts an expansive damping force by applying resistance to a flow of the hydraulic oil moving to the reservoir 17 through the discharge passage 15 using the damping valve V to increase an internal pressure of the rod-side chamber 13.

As described above, the shock absorber S is a uni-flow type shock absorber in which the hydraulic oil is discharged from the cylinder 10 to the reservoir 17 through the discharge passage 15, and the hydraulic oil circulates in a uni-directional manner in the order of the piston-side chamber 14, the rod-side chamber 13, and the reservoir 17 in either the expanding or contracting operation. That is, the shock absorber S is designed to generate both the expansive and contractive damping forces using a single damping valve V.

In the shock absorber S, the amount of hydraulic oil discharged from the cylinder 10 can be set to be the same between the expanding and contracting operations if the cross-sectional area of the rod 12 is set to a half of the cross-sectional area of the piston 11, and the piston 11 moves by the same amplitude. Therefore, by setting the resistance applied by the damping valve V to the flow to be the same, it is possible to set the expansive and contractive damping forces to be the same.

The damping valve V according to this embodiment includes a valve seat member 1 fitted to a sleeve 16a provided in an opening of the intermediate tube 16, a subsidiary valve body 2 floatably mounted to an outer circumference of an assembly shaft 1c provided in the valve seat member 1 and seated on or unseated from the first valve seat 1b, a valve body 3 similarly mounted to the outer circumference of the assembly shaft 1c provided in the valve seat member 1, a valve-body intermediate chamber C provided between the subsidiary valve body 2 and the valve body 3, and a restrictive passage 2b that causes the port 1a and the valve-body intermediate chamber C to communicate with each other.

The damping valve V further includes a cavity valve housing 20 connected to the assembly shaft 1c of the valve seat member 1, a tubular pilot valve seat member 21 housed in the valve housing 20, a pilot valve body 22 slidably inserted into the pilot valve seat member 21, and a solenoid Sol exerting a thrust force to the pilot valve body 22. A pilot passage 23 for reducing the pressure upstream of the port 1a and guiding it to the back-pressure chamber P is provided in the valve seat member 1 and the inside of the valve housing 20.

As illustrated in FIG. 1, the valve seat member 1 includes a large-diameter basal portion 1d fitted to the sleeve 16a, an assembly shaft 1c protruding from the basal portion 1d toward the pilot valve seat member 21, a cavity 1e formed to penetrate through the basal portion 1d and the assembly shaft 1c in an axial direction to form a part of the pilot passage 23, an orifice 1f provided in the middle of the cavity 1e, a plurality of ports 1a penetrating through the basal portion 1d, and an annular first valve seat 1b formed in an end of the basal portion 1d in the pilot valve seat member 21 side and in an outer circumferential side of the exit of the port 1a.

The port 1a penetrates through the basal portion 1d of the valve seat member 1 as described above. An opening of the port 1a in the inner circumferential side of the basal portion 1d communicates with the rod-side chamber 13 via the discharge passage 15 formed in the intermediate tube 16, and an opening of the port 1a in the subsidiary valve body 2 side communicates with the reservoir 17. That is, the shock absorber S is designed to discharge the hydraulic oil from the rod-side chamber 13 to the reservoir 17 through the discharge passage 15 and the port 1a during expansion or contraction operation, and the upstream of the port 1a serves as the rod-side chamber 13. In addition, similar to the port 1a, the cavity 1e communicates with the rod-side chamber 13 via the discharge passage 15.

In the valve seat member 1, a small diameter portion 1g obtained by reducing a diameter of the basal portion 1d in the discharge passage 15 side is fitted to the sleeve 16a, and a seal ring 24 is mounted to an outer circumference of the small diameter portion 1g. As a result, a gap between the small diameter portion 1g and the sleeve 16a is sealed so as to prevent the discharge passage 15 from communicating with the reservoir 17 through the outer circumference of the basal portion 1d.

The subsidiary valve body 2 seated on or unseated from the first valve seat 1b to open or close the port 1a is stacked on an end of the basal portion 1d of the valve seat member 1 opposite to the small diameter portion 1g. The subsidiary valve body 2 having an annular shape includes an annular second valve seat 2a protruding oppositely to the valve seat member 1, and a restrictive passage 2b that is opened from the inner circumferential side of the second valve seat 2a and communicates with the surface of the valve seat member 1 side.

The end of the exit of the port 1a is blocked by the subsidiary valve body 2 while the subsidiary valve body 2 is seated on the first valve seat 1b. The restrictive passage 2b is configured to apply resistance to a flow of the passing hydraulic oil. Although described below in more detail, as the hydraulic oil passing through the port 1a passes through the restrictive passage 2b and moves to the rear side of the subsidiary valve body 2, that is, oppositely to the valve seat member 1, a differential pressure is generated between the front side of the subsidiary valve body 2, that is, the valve seat member 1 side, and the rear side.

The subsidiary valve body 2 is slidably mounted to an outer circumference of an annular spacer 25 mounted to the outer circumference of the assembly shaft 1c of the valve seat member 1. A thickness of the spacer 25 in the axial direction is larger than a thickness of the inner circumference of the subsidiary valve body 2 in the axial direction, and the subsidiary valve body 2 is configured such that the outer circumference of the spacer 25 can move in the axial direction. As a result, the subsidiary valve body 2 is assembled with the valve seat member 1 floatably. The subsidiary valve body 2 is seated on or unseated from the first valve seat 1b by approaching or receding from the valve seat member 1, and the port 1a is opened as the subsidiary valve body 2 is unseated from the first valve seat 1b.

The valve body 3 is stacked on the rear side of the subsidiary valve body 2. The valve body 3 is an annular laminated leaf valve. The inner circumference of the valve body 3 is assembled with the assembly shaft 1c, and is interposed between the spacer 25 and the valve housing 20 screwed to the assembly shaft 1c. Therefore, the valve body 3 can be flexed toward the outer circumferential side so as to be seated on or unseated from the second valve seat 2a of the subsidiary valve body 2.

The inner circumference of the valve body 3 is stacked on the spacer 25, and the outer circumference of the valve body 3 is seated on the second valve seat 2a. Therefore, a valve-body intermediate chamber C is formed between the valve body 3 and the subsidiary valve body 2. The valve-body intermediate chamber C communicates with the port 1a via the restrictive passage 2b. As the valve body 3 is flexed and is unseated from the second valve seat 2a by a pressure applied to the valve-body intermediate chamber C via the restrictive passage 2b, an annular gap is formed between the subsidiary valve body 2 and the valve body 3. As a result, the hydraulic oil passing through the port 1a and the restrictive passage 2b can move to the reservoir 17 through the gap between the valve body 3 and the subsidiary valve body 2. That is, even when the subsidiary valve body 2 is seated on the first valve seat 1b, the port 1a is opened, and communication to the reservoir 17 is obtained if the valve body 3 is flexed and is unseated from the second valve seat 2a. That is, the valve body 3 is configured to open or close the port 1a.

As the valve body 3 is flexed, and the subsidiary valve body 2 is raised by a pressure received from the port 1a, the subsidiary valve body 2 slides on the outer circumference of the spacer 25 and is unseated from the first valve seat 1a. In this case, the hydraulic oil passing through the port 1a is discharged to the reservoir 17 through the annular gap formed between the subsidiary valve body 2 and the first valve seat 1a.

The valve body 3 is a laminated leaf valve obtained by stacking a plurality of annular plates. The number of the annular plates is set to an arbitrary number. A cutout orifice 3a is provided in the outer circumference of the annular plate of the valve body 3 seated on the second valve seat 2a. The orifice may be provided by forming a notch or the like in the second valve seat 2a of the subsidiary valve body 2 except for the valve body 3 or may be provided in the first valve seat 1b of the valve seat member 1 or a portion of the subsidiary valve body 2 abutting on the first valve seat 1b.

The restrictive passage 2b may be formed in any configuration if it can cause the front and rear sides of the subsidiary valve body 2 to communicate with each other. For example, the restrictive passage 2b may be provided in any place other than the subsidiary valve body 2. If the restrictive passage 2b is provided in the subsidiary valve body 2, it is possible to facilitate fabrication.

A washer 26, an annular plate spring 27, and a washer 28 are stacked sequentially in the side of the valve body 3 opposite to the subsidiary valve body 2 and are assembled to the assembly shaft 1c. The valve housing 20 is screwed to the leading end of the assembly shaft 1c. As a result, the spacer 25, the valve body 3, the washer 26, the plate spring 27, and the washer 28 assembled to the assembly shaft 1c are fixed between the basal portion 1d of the valve seat member 1 and the valve housing 20.

The subsidiary valve body 2 mounted to the outer circumference of the spacer 25 is movable along the axial direction.

The inner circumferential side of the plate spring 27 is fixed to the assembly shaft 1c, and the outer circumferential side thereof serves as a free end.

As illustrated in FIG. 1, the valve housing 20 includes a small-diameter tubular portion 20a having a tubular shape and a small outer diameter, a large-diameter tubular portion 20b having a large outer diameter, an annular groove 20c provided in the outer circumference of the large-diameter tubular portion 20b, a pressure introduction horizontal hole 20d opened in the annular groove 20c to communicate with the inner circumference of the large-diameter tubular portion 20b, and a pressure introduction vertical hole 20e opened in the end of the large-diameter tubular portion 20b in the small-diameter tubular portion 20a side to communicate with the pressure introduction hole horizontal 20d.

The valve housing 20 is connected to the valve seat member 1 by screwing the screw hole portion 20f provided inward of the small-diameter tubular portion 20a into the assembly shaft 1c of the valve seat member 1. The end of the large-diameter tubular portion 20b opposite to the small-diameter tubular portion 20a is provided with an annular protrusion 20g in the inner circumferential side and a plurality of tooling holes 20h opened in the edge. The valve housing 20 can be easily screwed into the assembly shaft 1c by inserting a tool to the tooling holes 20h and rotating it.

A synthetic resin ring 29 is mounted to the annular groove 20c of the valve housing 20. A tubular spool 30 is slidably mounted to the outer circumference of the ring 29. That is, the spool 30 is movable along the axial direction with respect to the valve housing 20.

A flange 30a protruding inward is provided in an end of the spool 30 in the valve body 3 side. The flange 30a has an annular projection 30b protruding toward the valve body 3.

The outer circumference of the plate spring 27 abuts on the end of the flange 30a opposite to the annular projection 30b. The spool 30 is biased by the plate spring 27 toward the valve body 3, and the annular projection 30b abuts on the surface of the valve body 3 opposite to the subsidiary valve body 2.

The spool 30 forms the back-pressure chamber P in a gap between the spool 30 and the valve housing 20 in cooperation with the valve housing 20. The back-pressure chamber P communicates with the valve housing 20 via the pressure introduction vertical hole 20e and the pressure introduction horizontal hole 20d as the end of the valve body 3 side is blocked by the plate spring 27. The inside of the valve housing 20 communicates with the cavity 1e of the valve seat member 1 and communicates with the rod-side chamber 13 upstream of the port 1a via the orifice 1f. The hydraulic oil discharged from the rod-side chamber 13 is guided to the back-pressure chamber P through the orifice 1f, and the pressure upstream of the port 1a is reduced by the orifice 1f and is introduced into the back-pressure chamber P.

The rear face of the valve body 3 receives a biasing force for pressing the valve body 3 toward the subsidiary valve body 2 by virtue of an internal pressure of the back-pressure chamber P in addition to the biasing force of the plate spring 27 for biasing the spool 30. That is, when the shock absorber S is operated to expand or contract, the subsidiary valve body 2 receives the internal pressure of the rod-side chamber 13 from the front side through the port 1a, and the internal pressure of the back-pressure chamber P and the biasing force caused by the plate spring 27 from the rear side via the valve body 3.

A force obtained by multiplying the pressure of the back-pressure chamber P by a cross-sectional area of the inner diameter of the spool 30 in the valve housing 20 side rather than the flange 30a is exerted to the valve body 3 to approach the subsidiary valve body 2. In addition, a force obtained by multiplying the pressure of the valve-body intermediate chamber C by a cross-sectional area of the inner diameter of the second valve seat 2a is exerted to the valve body 3 to recede from the subsidiary valve body 2. A ratio between the cross-sectional area of the inner diameter of the spool 30 in the valve housing 20 side rather than the flange 30a and the cross-sectional area of the inner diameter of the second valve seat 2a defines a pressure boosting ratio as a ratio of the valve opening pressure of the valve body 3 against the internal pressure of the back-pressure chamber P. It is noted that a hole may be provided in the plate spring 27 to directly apply the internal pressure of the back-pressure chamber P to the valve body 3.

As the internal pressure of the valve-body intermediate chamber C increases by the internal pressure of the rod-side chamber 13, a force of flexing the outer circumference of the valve body 3 toward the spool 30 surpasses the internal pressure of the back-pressure chamber P and the biasing force caused by the plate spring 27, the valve body 3 is flexed and is unseated from the second valve seat 2a to form a gap between the valve body 3 and the subsidiary valve body 2, so that the port 1a is opened.

According to this embodiment, the inner diameter of the second valve seat 2a is larger than the inner diameter of the first valve seat 1b, and an area of the subsidiary valve body 2 pressed from the port 1a side is different from an area of the subsidiary valve body 2 pressed from the valve-body intermediate chamber C side. Therefore, if the differential pressure generated by the restrictive passage 2b does not reach the valve opening pressure for unseating the subsidiary valve body 2 from the first valve seat 1b, the subsidiary valve body 2 remains to be seated on the first valve seat 1b.

Meanwhile, as the differential pressure generated by the restrictive passage 2b reaches the valve opening pressure for unseating the subsidiary valve body 2 from the first valve seat 1b while the valve body 3 is flexed to have an opened state, the subsidiary valve body 2 is also unseated from the first valve seat 1b to open the port 1a. That is, according to this embodiment, the pressure boosting ratio of the valve body 3 is set to be smaller than the pressure boosting ratio of the subsidiary valve body 2 which is a ratio of the valve opening pressure of the subsidiary valve body 2 against the pressure of the valve-body intermediate chamber C, and the internal pressure of the rod-side chamber 13 for the opening operation of the valve body 3 is lower than the internal pressure of the rod-side chamber 13 for the opening operation of the subsidiary valve body 2. That is, the valve opening pressure of the valve body 3 is set to be lower than that of the subsidiary valve body 2.

The annular groove 20c installed with the ring 29 communicates with the pressure introduction horizontal hole 20d. As a result, the ring 29 is pressed toward the spool 30 by the pressure received from the pressure introduction horizontal hole 20d. Therefore, as the pressure upstream of the port 1a increases, a force of pressing the ring 29 increases.

The ring 29 may be formed of, for example, a material resistant to abrasion of the sliding surface of the spool 30, such as fluororesin, synthetic resin, or brass. In addition, in order to facilitate installation of the ring 29 to the annular groove 20c, a bias cut (partition) 29a may be applied to the ring 29. When the ring 29 is provided with the bias cut 29a, it is possible to easily enlarge the diameter of the ring 29 using the pressure of the inner circumferential side, and easily suppress movement of the spool 30.

The tubular pilot valve seat member 21 is housed in the inside of the valve housing 20 in the side where the annular protrusion 20g rather than the screw hole portion 20f is provided.

The pilot valve seat member 21 includes a bottomed cylindrical valve container 21a, a flange portion 21b provided protrudingly outward in the outer circumference of the opening-side end of the valve container 21a, a penetrating hole 21c opened from the lateral side of the valve container 21a to communicate with the inside, an annular pilot valve seat 21d provided in the opening-side end of the valve container 21a protrudingly in the axial direction, and an annular valve catch 21e provided in the outer circumference of the flange portion 21b to be thicker than the flange portion 21b.

A failsafe valve body 31 having an annular laminated leaf valve is mounted to the outer circumference of the annular protrusion 20g of the valve housing 20. The failsafe valve body 31 is interposed between a surface of the large-diameter tubular portion 20b of the valve housing 20 where the annular protrusion 20g is provided and the valve catch 21e of the pilot valve seat member 21. As a result, the inner circumference of the failsafe valve body 31 is fixed, and the outer circumference of the failsafe valve body 31 can be flexed.

The pilot valve body 22 is slidably inserted into the valve container 21a of the pilot valve seat member 21. The pilot valve body 22 includes a small diameter portion 22a provided in the pilot valve seat member 21 side and slidably inserted into the valve container 21a, a large diameter portion 22b provided oppositely to the pilot valve seat member 21, an annular concave portion 22c provided between the small diameter portion 22a and the large diameter portion 22b, a flange-like spring shoe 22d provided in the outer circumference of the end opposite to the pilot valve seat member 21, a communicating channel 22e penetrating from one end of the pilot valve body 22 to the other end, an orifice 22f provided in the middle of the communicating channel 22e, and an annular projection 22g provided in the outer circumference of the end of the spring shoe 22d opposite to the pilot valve seat member 21.

The concave portion 22c of the pilot valve body 22 faces the penetrating hole 21c at all times when the pilot valve body 22 moves along the axial direction with respect to the pilot valve seat member 21. That is, the pilot valve body 22 does not block the penetrating hole 21c as long as the pilot valve body 22 is allowed to move.

As described above, with respect to the concave portion 22c, an outer diameter of the pilot valve body 22 in the side opposite to the pilot valve seat member 21 is large, and the end of the large diameter portion 22b in the pilot valve seat member 21 side is provided with an annular sitting portion 22h facing the pilot valve seat 21d. As the pilot valve body 22 moves along the axial direction with respect to the pilot valve seat member 21, the sitting portion 22h is seated on or unseated from the pilot valve seat 21d. That is, the pilot valve body 22 and the pilot valve seat member 21 constitute the pilot valve Pi, so that the pilot valve Pi is closed as the sitting portion 22h sits on the pilot valve seat 21d.

A perforated disc 32 fitted to the inner circumference of the annular projection 22g is stacked on the end of the spring shoe 22d opposite to the pilot valve seat member 21. The communicating channel 22e communicates with the rear side of the perforated disc 32 opposite to the pilot valve body 22 through a hole (not shown) of the perforated disc 32. A coil spring 33 that biases the pilot valve body 22 oppositely to the pilot valve seat member 21 is interposed between the spring shoe 22d and the flange portion 21b.

The pilot valve body 22 is biased by the coil spring 33 oppositely to the pilot valve seat member 21 at all times. Therefore, if a thrust force is not exerted from the solenoid Sol described below against the coil spring 33, the pilot valve Pi is opened. According to this embodiment, the pilot valve body 22 is biased to recede from the pilot valve seat member 21 using the coil spring 33. However, any other elastic material capable of exerting a biasing force may be employed instead of the coil spring 33.

As the pilot valve body 22 is inserted into the valve container 21a of the pilot valve seat member 21, a space K is formed closer to the bottom side of the valve container 21a than the penetrating hole 21c inside the valve container 21a. The space K communicates with the pilot valve Pi via the communicating channel 22e and the orifice 22f provided in the pilot valve body 22. As a result, when the pilot valve body 22 moves along the axial direction with respect to the pilot valve seat member 21, the space K serves as a dash pot, so that it is possible to suppress abrupt displacement of the pilot valve body 22 and a vibrating motion of the pilot valve body 22.

A failsafe valve seat member 34 stacked on the large-diameter tubular portion 20b side of the valve housing 20 is provided in the outer circumference of the pilot valve body 22. The failsafe valve seat member 34 includes an annular socket portion 34a provided in the outer circumference and fitted to the outer circumference of the large-diameter tubular portion 20b of the valve housing 20, an annular window 34b provided in the end of the valve housing 20 side, a failsafe valve seat 34c provided in the outer circumference of the annular window 34b, an annular concave portion 34d provided in the inner circumferential side of the annular window 34b, a plurality of channels 34e formed from the inner circumference to the annular concave portion 34d to communicate with the annular window 34b, an annular flange 34f provided in the inner circumference on the end opposite to the valve housing 20 to protrude inward, a plurality of notches 34g provided in the end opposite to the valve housing 20, and a through-hole 34h penetrating through the socket portion 34a.

The inner diameter of the failsafe valve seat member 34 excluding the flange 34f is set not to hinder movement of the pilot valve body 22. As the pilot valve body 22 is biased by the coil spring 33 while no thrust force is received from the solenoid Sol, the outer circumference of the annular projection 22g of the pilot valve body 22 abuts on the flange 34f so as to prevent further movement oppositely to the valve housing 20. As a result, it is possible to block an opening end of the failsafe valve seat member 34 opposite to the valve housing 20 using the pilot valve body 22.

As the failsafe valve seat member 34 is stacked on the valve housing 20, the valve catch 21e of the pilot valve seat member 21 is interposed between the failsafe valve seat member 34 and the valve housing 20 along with the failsafe valve body 31, so as to fix the pilot valve seat member 21 and the failsafe valve body 31. The valve container 21a of the pilot valve seat member 21 is housed in the valve housing 20. In this case, by fitting the outer circumference of the valve catch 21e to the annular concave portion 34d provided in the failsafe valve seat member 34, the pilot valve seat member 21 is positioned in the failsafe valve seat member 34 in the radial direction.

The failsafe valve body 31 is seated on the failsafe valve seat 34c provided in the failsafe valve seat member 34 to block the annular window 34b. The failsafe valve body 31 is unseated from the failsafe valve seat 34c to open the annular window 34b as it is flexed by virtue of the pressure from the annular window 34b, so that the inside of the failsafe valve seat member 34 communicates with the reservoir 17 via the channel 34e and the through-hole 34h. In this manner, according to this embodiment, the failsafe valve body 31 and the failsafe valve seat member 34 constitute the failsafe valve F. In addition, a failsafe channel branching from the pilot passage 23 to cause the pilot passage 23 to communicate with the reservoir 17 is formed by the channel 34e and the through-hole 34h. The channel 34e is formed by a trench provided in the valve housing 20 side of the failsafe valve seat member 34. Therefore, it is possible to facilitate fabrication. Naturally, instead of the trench, a hole may be formed as the channel 34e.

As described above, the damping valve V causes the rod-side chamber 13 and the reservoir 17 to communicate with each other using the port 1a, and the port 1a is opened or closed by the subsidiary valve body 2 and the valve body 3. In addition to the route passing through the port 1a, the pilot passage 23 for causing the rod-side chamber 13 and the reservoir 17 to communicate with each other is formed by the cavity 1e of the valve seat member 1, the inside of the valve housing 20, the penetrating hole 21c of the pilot valve seat member 21, the inside of the pilot valve seat member 21, the concave portion 22c of the pilot valve body 22, the inside of the failsafe valve seat member 34, and the notch 34g of the failsafe valve seat member 34.

The pilot passage 23 communicates with the back-pressure chamber P via the pressure introduction vertical hole 20e and the pressure introduction horizontal hole 20d provided in the valve housing 20, so that the pressure upstream of the port 1a is reduced by the orifice 1f provided in the middle of the pilot passage 23 and is introduced into the back-pressure chamber P. In addition, the pilot passage 23 is opened or closed by the pilot valve Pi, so that it is possible to control the internal pressure of the back-pressure chamber P by controlling the opening level of the pilot valve Pi. The shock absorber S is provided with the solenoid Sol for exerting a thrust force to the pilot valve body 22 in order to control the opening level of the pilot valve Pi.

As the pilot valve body 22 is biased by the coil spring 33, and the outer circumference of the annular projection 22g abuts on the flange 34f, the communication between the notch 34g and the inside of the failsafe valve seat member 34 is disconnected. That is, the pilot valve body 22 is separated from the pilot valve seat 21d at maximum, so that the side of the pilot passage 23 downstream from the connection point of the failsafe channel is blocked. If the internal pressure of the pilot passage 23 increases in this state and reaches the valve opening pressure of the failsafe valve body 31, the failsafe valve body 31 is unseated from the failsafe valve seat 34c. As a result, it is possible to cause the pilot passage 23 to communicate with the reservoir 17 via the channel 34e, the annular window 34d, and the through-hole 34h.

An opening provided in the outer tube 18 is installed with the sleeve 18a, and the solenoid Sol is housed in the bottomed cylindrical casing 35 screwed to the outer circumference of the sleeve 18a.

The solenoid Sol includes an annular solenoid bobbin 39 fixed to the bottom portion of the casing 35 with a coil 38 being wound around, a bottomed cylindrical first fixed iron core 40 fitted to the inner circumference of the solenoid bobbin 39, a tubular second fixed iron core 41 fitted to the inner circumference of the solenoid bobbin 39, a nonmagnetic filler ring 42 interposed between the first and second fixed iron cores 40 and 41 to form a gap between the first and second fixed iron cores 40 and 41 and fitted to the inner circumference of the solenoid bobbin 39, a tubular movable iron core 43 arranged in the inner circumferential side of the first fixed iron core 40, and a shaft 44 fixed to the inner circumference of the movable iron core 43.

The casing 35 includes a tubular portion 35a and a bottom portion 35b fixed by caulking an opening end of the tubular portion 35a. When the opening end of the tubular portion 35a is caulked, a bobbin holder 36 is fixed to the inner circumference of the tubular portion 35a along with the bottom portion 35b. The bobbin holder 36 holds the solenoid bobbin 39, and the solenoid bobbin 39 is installed in the casing 35 using the bobbin holder 36.

As the casing 35 is screwed to the sleeve 18a, the flange 41a provided in the outer circumference of the second fixed iron core 41 is interposed between the casing 35 and the sleeve 18a. As a result, the filler ring 42 and the first fixed iron core 40 are fixed inside the casing 35.

The movable iron core 43 having a tubular shape has an inner circumference where the shaft 44 extending from both ends in the axial direction is mounted. An annular guide 46 is fitted to the inner circumference of the second fixed iron core 41, and an annular bushing 47 is held in the inner circumference of the guide 46. The shaft 44 is held by annular bushings 45 and 47 provided in the bottom portion of the first fixed iron core 40 movably in the axial direction, so that the bushings 45 and 47 guides movement of the shaft 44 in the axial direction.

As the second fixed iron core 41 is fixed to the casing 35 as described above, the guide 46 fitted to the inner circumference of the second fixed iron core 41 abuts on the failsafe valve seat member 34. As a result, the failsafe valve seat member 34, the pilot valve seat member 21, the valve housing 20, and the valve seat member 1 are fixed to the shock absorber S. Since the failsafe valve seat member 34 has the notch 34g, the pilot passage 23 is not blocked even when the guide 46 abuts on the failsafe valve seat member 34.

An end of the bushing 47 side of the shaft 44 abuts on the perforated disc 32 fitted to the inner circumference of the annular projection 22g of the pilot valve body 22. As a result, the biasing force of the coil spring 33 is also exerted to the shaft 44 via the pilot valve body 22. The coil spring 33 biases the shaft 44 serving as one of the elements of the solenoid Sol as well as the pilot valve body 22.

The second fixed iron core 41 has a tubular sleeve 41b fitted to the inner circumference of the sleeve 18a. As a result, each element of the solenoid Sol is positioned in the radial direction with respect to the sleeve 18a.

A notch (not shown) is provided in the outer circumference of the failsafe valve seat member 34. As a result, a gap between the sleeve 41b and the failsafe valve seat member 34 is not blocked, so that it is possible to sufficiently obtain an area of the flow path of the pilot passage 23. In addition, the axial length of the sleeve 41b is set so as not to interfere with the spool 30.

The guide 46 is provided with a hole 46a penetrating in the axial direction in order to prevent a pressure difference between the failsafe valve seat member 34 side and the movable iron core 43 side in the guide 46. In addition, the movable iron core 43 is also provided with a hole 43a penetrating in the axial direction in order to prevent a pressure difference between the guide 46 side and the bushing 45 side in the movable iron core 43 and hindrance of appropriate movement of the movable iron core 43.

The solenoid Sol is formed such that a magnetic path passes through the first fixed iron core 40, the movable iron core 43, and the second fixed iron core 41, so that the movable iron core 43 arranged in the vicinity of the first fixed iron core 40 is attracted to the second fixed iron core 41 side as the coil 38 is magnetically excited. That is, a thrust force directed to the pilot valve Pi side is exerted to the movable iron core 43.

The shaft 44 moving in synchronization with the movable iron core 43 abuts on the pilot valve body 22 of the pilot valve Pi as illustrated in FIG. 1, so that the thrust force of the solenoid Sol is transmitted to the pilot valve body 22. That is, when the solenoid Sol is magnetically excited, it is possible to exert a thrust force directed to the valve seat member 1 side from the movable iron core 43 to the pilot valve body 22 via the shaft 44.

When the solenoid Sol is not magnetically excited, the pilot valve body 22 is pressed by the coil spring 33, so that the pilot valve body 22 is unseated from the pilot valve seat 21$d$ to open the pilot valve Pi at maximum. At the same time, the pilot valve body 22 is seated on the flange 34$f$ of the failsafe valve seat member 34 so as to block the pilot passage 23. As a result, the failsafe valve F functions effectively.

The thrust force exerted to the pilot valve body 22 can be controlled based on an electric current amount to the coil 38 of the solenoid Sol. As a result, it is possible to control the valve opening pressure of the pilot valve Pi.

A description will be made in more detail.

As an electric current is supplied to the solenoid Sol to exert a thrust force to the pilot valve body 22, the pilot valve body 22 is pressed to the pilot valve seat 21$d$ resisting to the biasing force of the coil spring 33.

As the upstream pressure of the pilot passage 23 is applied to the pilot valve body 22, and a resultant force between the force of unseating the pilot valve body 22 from the pilot valve seat 21$d$ and the biasing force of the coil spring 33 exceeds the thrust force of the solenoid Sol, the pilot valve Pi is opened so as to open the pilot passage 23.

That is, as the upstream pressure of the pilot passage 23 reaches the valve opening pressure, the pilot valve Pi is opened so as to open the pilot passage 23. In this manner, by controlling the thrust force of the solenoid Sol using the level of the electric current amount supplied to the solenoid Sol, it is possible to control a level of the valve opening pressure of the pilot valve Pi.

As the pilot valve Pi is opened, the pressure of the pilot passage 23 upstream from the pilot valve Pi becomes equal to the valve opening pressure of the pilot valve Pi. Accordingly, the pressure of the back-pressure chamber P obtained by introducing the pressure of the pilot passage 23 upstream from the pilot valve Pi is also controlled to this valve opening pressure.

Subsequently, a description will be made for operation of the damping valve V.

As the shock absorber S expands or contracts so that the hydraulic oil is discharged from the rod-side chamber 13 to the reservoir 17 through the damping valve V, the pressures upstream of the port 1$a$ and the pilot passage 23 increase if the damping valve V is normally operated. Here, when the valve opening pressure of the pilot valve Pi is controlled by supplying an electric current to the solenoid Sol, the pressure of the pilot passage 23 between the orifice 1$f$ and the pilot valve Pi is guided to the back-pressure chamber P.

The internal pressure of the back-pressure chamber P is controlled to the valve opening pressure of the pilot valve Pi. Therefore, by controlling this valve opening pressure using the solenoid Sol, it is possible to control the pressure applied to rear face of the valve body 3. That is, it is possible to control the valve opening pressure for causing the valve body 3 to open the port 1$a$.

More specifically, as the internal pressure of the valve-body intermediate chamber C increases by the internal pressure of the rod-side chamber 13, and the force of flexing the outer circumference of the valve body 3 surpasses the internal pressure of the back-pressure chamber P and the biasing force of the plate spring 27, the valve body 3 is flexed and is unseated from the second valve seat 2$a$. That is, a gap is formed between the valve body 3 and the subsidiary valve body 2 to open the port 1$a$.

As a result, it is possible to control the pressure of the valve-body intermediate chamber C for unseating the valve body 3 from the second valve seat 2$a$ by controlling the internal pressure of the back-pressure chamber P. That is, it is possible to control the valve opening pressure of the valve body 3 using the electric current amount supplied to the solenoid Sol.

Figure 3:
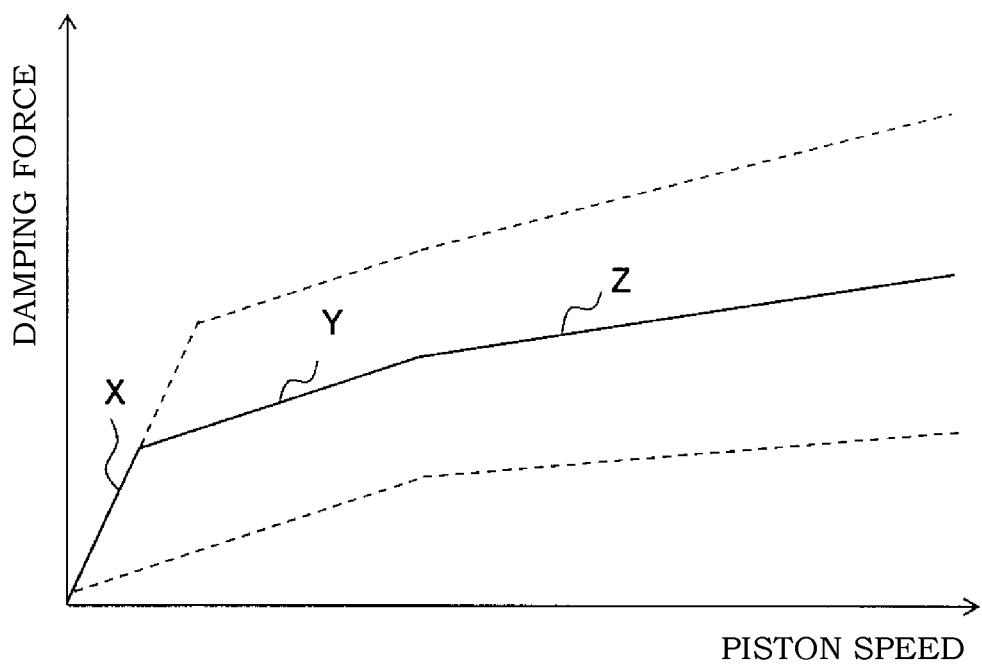
FIG. 3 is a diagram illustrating a damping characteristic of the shock absorber provided with the damping valve according to an embodiment of this invention.

Therefore, as illustrated in FIG. 3, a damping characteristic of the damping valve V (a characteristic of the damping force against the piston speed) has a slight slope (as indicated by the plot X in FIG. 3) because the hydraulic oil passes through the sliding gap of the damping valve V and the orifice 3$a$ until the valve body 3 is opened. As the valve body 3 is unseated from the second valve seat 2$a$ so as to open the port 1$a$, the slope is reduced as indicated by the plot Y. That is, a damping coefficient decreases.

Since the pressure boosting ratio of the valve body 3 is smaller than the pressure boosting ratio of the subsidiary valve body 2 as described above, the valve opening pressure of the valve body 3 is lower than the valve opening pressure of the subsidiary valve body 2. Therefore, if the differential pressure generated by the restrictive passage 2$b$ does not reach the valve opening pressure for unseating the subsidiary valve body 2 from the first valve seat 1$b$, the subsidiary valve body 2 remains to be seated on the first valve seat 1$b$.

While the valve body 3 is opened, as the differential pressure generated by the restrictive passage 2$b$ reaches the valve opening pressure for unseating the subsidiary valve body 2 from the first valve seat 1$b$, by the piston speed of the shock absorber S increases, the subsidiary valve body 2 is also unseated from the first valve seat 1$b$ so as to open the port 1$a$.

In this case, as the subsidiary valve body 2 is unseated from the first valve seat 1$b$, the port 1$a$ directly communicates with the reservoir 17 without using the restrictive passage 2$b$. Therefore, an area of the flow path is enlarged, compared to the case where only the valve body 3 is opened, and the port 1$a$ communicates with the reservoir 17 only through the restrictive passage 2$b$. Therefore, the slope of the damping characteristic of the damping valve V is reduced as indicated by the plot Z in FIG. 3, compared to the case where only the valve body 3 is opened. That is, the damping coefficient further decreases.

If the valve opening pressure of the pilot valve Pi is changed by controlling the electric current amount to the solenoid Sol, the damping characteristic of the damping valve V is changed such that the plots Y and Z vertically move within a range indicated by the dotted lines in FIG. 3.

In the damping valve V, it is possible to set the pressure boosting ratio of the valve body 3 to be lower than the pressure boosting ratio of the subsidiary valve body 2. As a result, the valve opening pressure of the valve body 3 becomes lower than the valve opening pressure of the subsidiary valve body 2. That is, the damping valve V relieves the port 1$a$ in two stages. Therefore, using the damping valve V, it is possible to reduce the damping force for the full soft setting at a low speed, in which the valve opening pressure of the pilot valve Pi is set to the minimum, and widen the damping force control range, compared to a damping valve of the prior art.

Using the damping valve V according to this embodiment, it is possible to output a soft damping force and prevent an excessive damping force when the piston speed of the shock absorber S is at a low speed range. In addition, it is possible to raise an upper limitation of the hard damping force desired when the piston speed is at a high speed range and prevent an insufficient damping force. Therefore, by applying the damping valve V to the shock absorber S, it is possible to widen a damping force control range and improve a riding quality of a vehicle.

According to this embodiment, the pilot valve Pi has the pilot valve seat member 21 and the pilot valve body 22. The pilot valve seat member 21 has the tubular valve container 21a having the penetrating hole 21c for connecting the inside and the outside, and the annular pilot valve seat 21d provided in the end of the valve container 21a. The pilot valve body 22 has the small diameter portion 22a slidably inserted into the valve container 21a, the large diameter portion 22b, and the concave portion 22c provided between the small diameter portion 22a and the large diameter portion 22b to face the penetrating hole 21c. The pilot valve Pi is configured such that the end of the large diameter portion 22b of the pilot valve body 22 is seated on or unseated from the pilot valve seat 21d of the pilot valve seat member 21.

Figure 4:
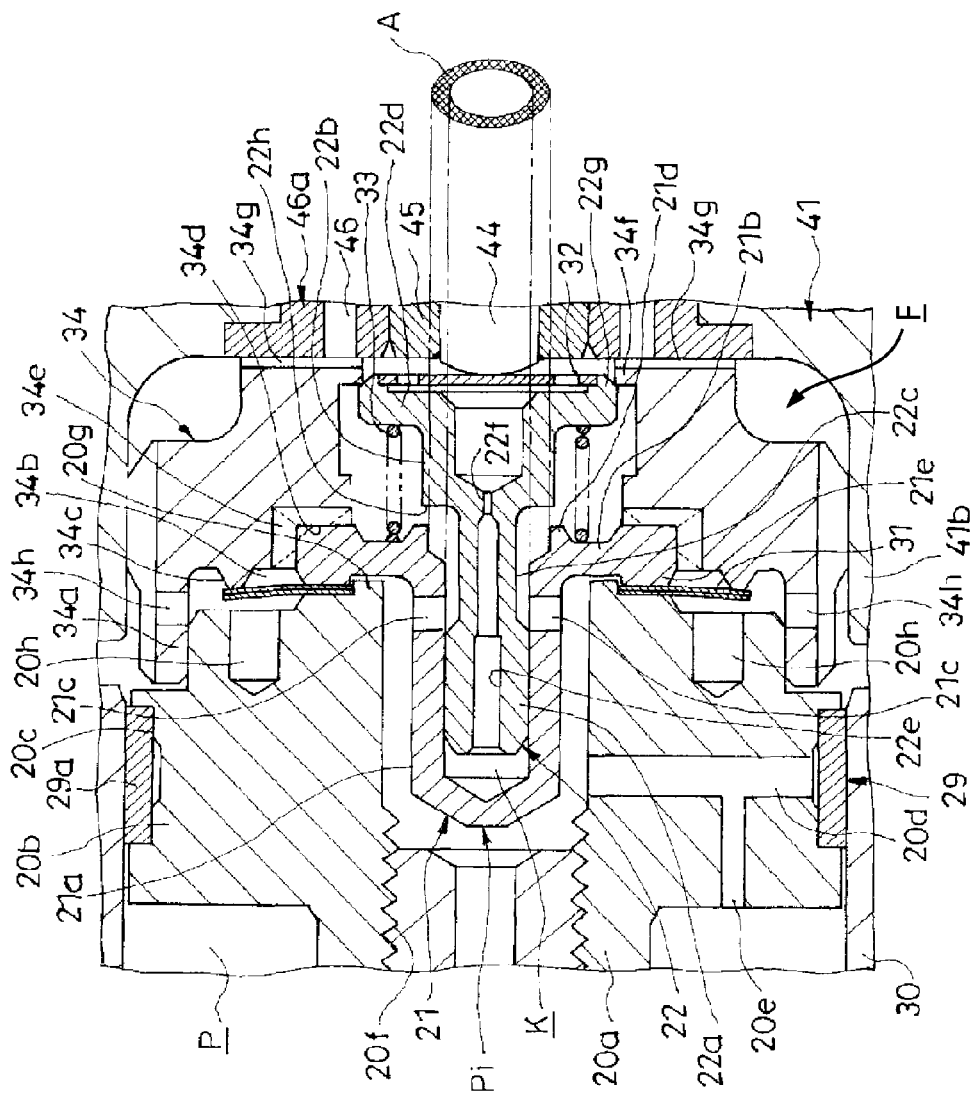
FIG. 4 is an enlarged cross-sectional view illustrating a pilot valve of the damping valve according to an embodiment of this invention.

As a result, using the pilot valve Pi, it is possible to reduce an area A of the pressure applied to extract the pilot valve body 22 from the pilot valve seat member 21 as illustrated in FIG. 4 and enlarge an area of the flow path during the valve opening operation.

Figure 5:
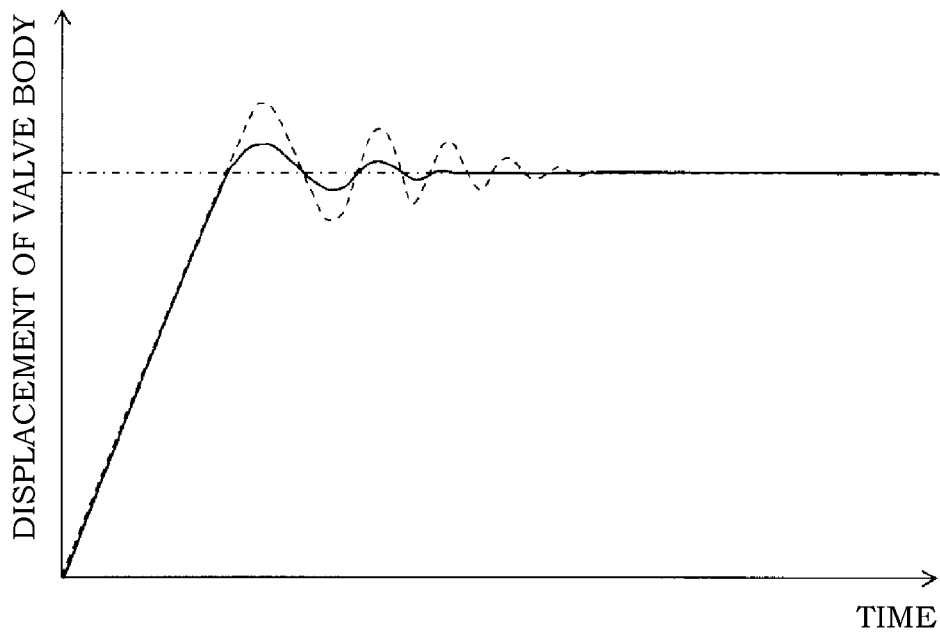
FIG. 5 is a diagram illustrating a temporal change of a displacement amount of a valve body after the pilot valve is opened.

Here, similar to the damping valve of the prior art discussed in the JP 2009-222136 A, if the port is just an open/close valve opened or closed by a poppet valve, the area of the flow path is small relative to the valve open level of the pilot valve. Therefore, a distance between the pilot valve and the valve seat can be easily increases. In this case, as indicated by the dotted line in FIG. 5, it takes a long time until the valve body is stabilized to a statically balanced position (indicated by the one-dotted dash line in FIG. 5) after the pilot valve is opened. In addition, since the overshoot becomes significant, the generated damping force abruptly changes, and it takes time until the damping force is stabilized.

In comparison, in the pilot valve Pi according to this embodiment, it is possible to enlarge the area of the flow path relative to the clearance between the pilot valve body 22 and the pilot valve seat 21d while the area of the pressure for separating the pilot valve body 22 from the pilot valve seat 21d is reduced. Therefore, it is possible to reduce the time taken to stabilize the pilot valve body 22 to the statically balanced position without increasing a size of an actuator such as the solenoid Sol as indicated by the solid line in FIG. 5. Accordingly, the size of the damping valve V does not increase as well. Furthermore, it is possible to suppress an abrupt change of the damping force of the damping valve V and exert a stable damping force with excellent responsiveness.

The internal pressure of the back-pressure chamber P is applied to the annular groove 20c provided in the outer circumference of the valve housing 20 to press the ring 29 mounted to the annular groove 20c so as to enlarge its diameter. For this reason, a frictional force generated between the spool 30 and the ring 29 making sliding contact with the inner circumference of the spool 30 increases as the electric current supply amount to the solenoid Sol increases, and the valve opening pressure of the pilot valve Pi increases.

That is, since a frictional force for suppressing the axial movement of the spool 30 with respect to the valve housing 20 increases, it is difficult to open the subsidiary valve body 2 and the valve body 3. Therefore, as the valve opening pressure of the pilot valve Pi increases, a damping characteristic for the hard setting has a higher damping coefficient than that of the damping characteristic for the soft setting.

Figure 6:
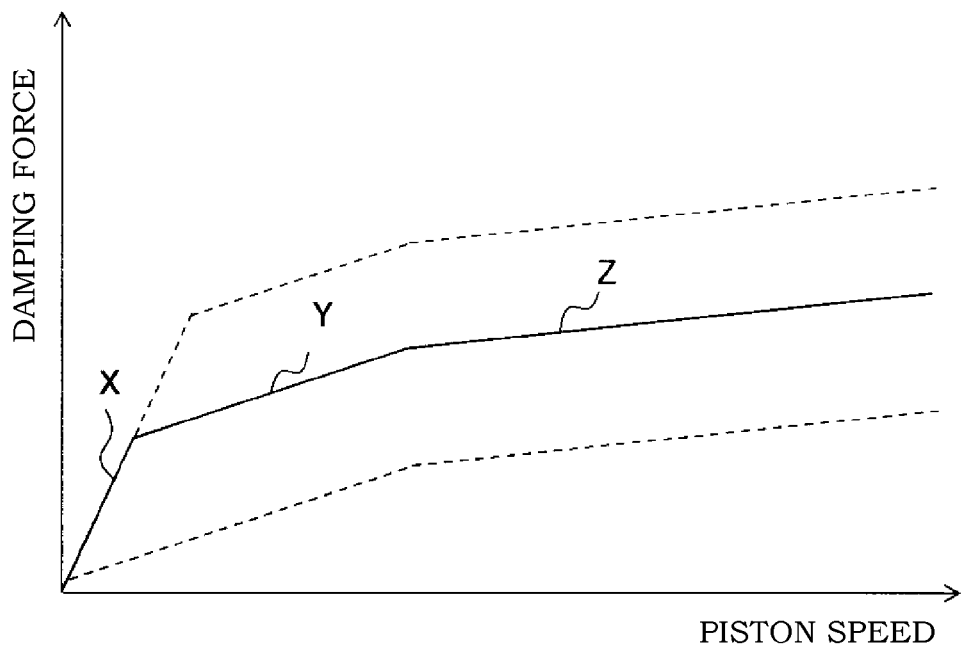
FIG. 6 is diagram illustrating a damping characteristic of a shock absorber provided with a damping valve according to a modification of the embodiment.

If the ring 29 is provided in this manner, and the internal pressure of the back-pressure chamber P is applied to the inner circumference of the ring 29, it is possible to widen the damping force control range for the hard setting and generate the damping force suitable for a damping target in the shock absorber S. According to this embodiment, since the ring 29 has the bias cut 29a, it is possible to further suppress movement of the spool 30. Therefore, it is possible to intensify an effect of increasing the damping coefficient obtained by setting the back-pressure chamber P to a high pressure and increase a rise level of the damping coefficient. When the ring 29 is removed, a change of the damping coefficient does not occur as illustrated in FIG. 6. However, this is also allowable.

Since the ring 29 is pressed toward the spool 30 by virtue of the internal pressure of the back-pressure chamber P at all times, the ring 29 also seals the gap between the spool 30 and the valve housing 20. As a result, it is possible to control the internal pressure of the back-pressure chamber P as desired regardless of the clearance between the spool 30 and the valve housing 20. Therefore, the damping force generated by the damping valve V is stabilized without a variation.

Figure 7:
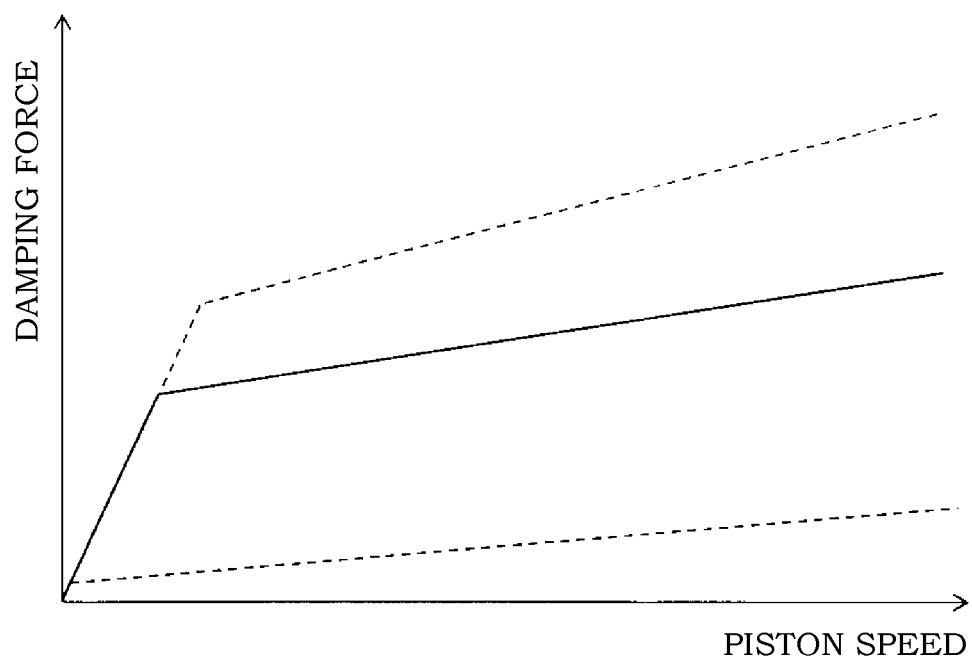
FIG. 7 is a diagram illustrating a damping characteristic of a shock absorber provided with a damping valve according to another modification of the embodiment.

Although the port 1a is opened in two stages by stacking the subsidiary valve body 2 on the valve seat member 1 and further stacking the valve body 3 on the subsidiary valve body 2 according to this embodiment, the subsidiary valve body 2 may be removed. If the subsidiary valve body 2 is removed, a configuration may be employed such that the valve body 3 is directly stacked on the first valve seat 1b of the valve seat member 1, the spool 30 abuts on the rear side of the valve body 3, and the valve body 3 is biased toward the first valve seat 1a using the pressure of the back-pressure chamber P. In this case, since only the valve body 3 opens the port 1a, the damping valve V makes the shock absorber S have a damping characteristic illustrated in FIG. 7.

In the damping valve V, the internal pressure of the back-pressure chamber P is controlled by exerting the thrust force to the pilot valve Pi depending on the electric current supplied to the solenoid Sol, so as to control the valve opening pressures of the subsidiary valve body 2 and the valve body 3. Therefore, it is possible to control the internal pressure of the back-pressure chamber P without depending on the flow rate of the hydraulic oil flowing through the pilot passage 23. As a result, a change of the damping force against the electric current supplied to the solenoid Sol becomes linear even when the piston speed of the shock absorber S stays at a low speed range. Therefore, it is possible to improve controllability. Furthermore, since the internal pressure of the back-pressure chamber P for biasing the valve body 3 is controlled by exerting the thrust force to the pilot valve Pi depending on the electric current supplied to the solenoid Sol, it is possible to reduce a variation of the damping force.

In the damping valve V, in the event of a failure, the electric current supplied to the solenoid Sol is shut down, and the pilot valve body 22 is pressed by the coil spring 33, so that the opening end of the failsafe valve seat member 34 opposite to the valve housing 20 is closed.

In this case, as the internal pressure of the rod-side chamber 13 reaches the valve opening pressure, the failsafe valve F is opened, and the pilot passage 23 communicates with the reservoir 17, so that the failsafe valve F applies resistance to the flow of the hydraulic oil. Therefore, the shock absorber S can serve as a passive shock absorber. It is possible to set the damping characteristic of the shock absorber S as desired in advance by setting the valve opening pressure of the failsafe valve F.

Although the solenoid Sol is employed to drive the pilot valve body 22 according to this embodiment, any other configuration such as an actuator may be employed instead of the solenoid Sol.

Even when the pilot valve Pi is used as a passive pressure control valve without controlling the valve opening pressure of the pilot valve Pi using an actuator such as the solenoid Sol, that is, even when the pressure of the back-pressure chamber P is not controlled, it is possible to increase the area of the flow path relative to a distance between the pilot valve body 22 and the pilot valve seat 21d. Therefore, it is possible to reduce a stroke of the coil spring 33 for biasing the pilot valve body 22 and suppress an increase of the size of the damping valve. Even in this case, it is possible to reduce an overshooting amount of the displacement of the pilot valve body 22 and a converging time. Therefore, an advantage of the stable damping force is not eliminated.

In addition, when the pilot valve Pi is used as a passive pressure control valve, that is, even when the pressure of the back-pressure chamber P is not controlled, it is possible to set the pressure boosting ratio of the valve body 3 to be smaller than that of the subsidiary valve body 2.

Therefore, since the damping characteristic of the shock absorber S can change in two stages, it is possible to output a soft damping force and prevent an excessive damping force when the piston speed is at a slow speed range. In addition, it is possible to output a hard damping force and prevent an insufficient damping force when the piston speed is at a high speed range.

Since the subsidiary valve body 2 is floatably stacked on the valve seat member 1, it is possible to open the port 1a across a wide area and reduce the damping coefficient when the subsidiary valve body 2 is opened. Therefore, it is possible to easily control the damping force using the solenoid Sol.

Since the valve body 3 is an annular leaf valve having an inner circumference fixed to the valve seat member 1 and an outer circumference seated on or unseated from the second valve seat 2a, this makes it easy to bias the subsidiary valve body 2 to return the subsidiary valve body 2 to the sitting position of the first valve seat 1b after the port 1a is opened. As a result, it is possible to prevent a delay in closing the port 1a when the shock absorber S expands or contracts frequently.

Therefore, it is possible to improve responsiveness for generating a damping force and remove necessity of installing a spring for facilitating returning of the subsidiary valve body 2. The valve body 3 may be floatably mounted to the valve seat member 1 in a disc-like shape as in the subsidiary valve body 2 of this embodiment instead of the leaf valve.

Since the first valve seat 1b has an annular shape, and the inner diameter of the second valve seat 2a is larger than that of the first valve seat 1b, it is possible to obtain a state in which the valve body 3 is opened, and the subsidiary valve body 2 is not opened. Therefore, it is possible to obtain a damping characteristic of the damping valve V relieved in two stages. In addition, since both the first and second valve seats 1b and 2a have an annular shape, it is possible to easily design the pressure boosting ratio of the subsidiary valve body 2. Although it is possible to easily design the pressure boosting ratio by providing the first and second valve seats 1b and 2a having an annular shape, they may have any shape other than the annular shape.

The damping valve V has the back-pressure chamber P provided in the side of the valve body 3 opposite to the main valve seat and biases the valve body 3 using the internal pressure of the back-pressure chamber P. Therefore, it is possible to prevent a variation of the valve opening pressure of the valve body 3 between each product by managing a dimension of the member for forming the back-pressure chamber P, exert a stable biasing force to the valve body 3, and exert a strong biasing force to the valve body 3.

Since the damping valve V has the pilot passage 23 for reducing the pressure upstream of the port 1a and guiding it to the back-pressure chamber P, it is possible to set the valve opening pressures of the subsidiary valve body 2 and the valve body 3 using the pressure upstream of the port 1a. In addition, since the damping valve V has the pilot valve Pi for controlling the internal pressure of the back-pressure chamber P, it is possible to obtain a variable damping force by controlling the valve opening pressures of the subsidiary valve body 2 and the valve body 3.

Although the pressure of the port 1a is reduced and is guided to the back-pressure chamber P using the orifice 1f provided in the pilot passage 23 in this embodiment, any type of valve such as a choke valve other than the orifice may be used to reduce the pressure.

Next, a description will be made for a damping valve V2 according to another embodiment of this invention.

Figure 8:
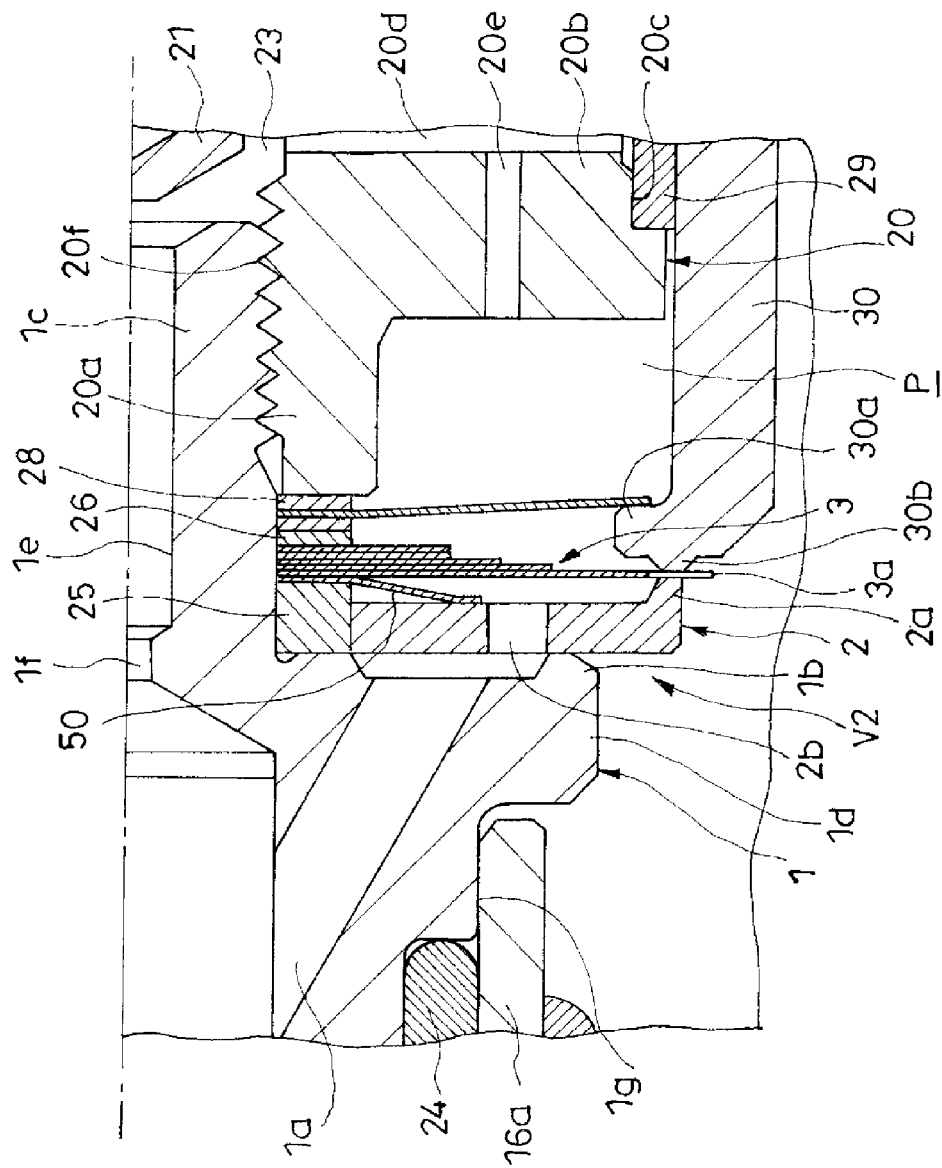
FIG. 8 is a partially enlarged cross-sectional view illustrating a damping valve according to another embodiment of this invention.

In the damping valve V, the subsidiary valve body 2 having an annular shape is slidably mounted to the outer circumference of the spacer 25 and is floatably installed to the valve seat member 1 as described above. In comparison, the damping valve V2 may be provided with a subsidiary valve body biasing means 50 for biasing the subsidiary valve body 2 toward the valve seat member 1 as illustrated in FIG. 8.

Specifically, the subsidiary valve body biasing means 50 is a disc spring interposed between the spacer 25 and the valve body 3 to bias the subsidiary valve body 2 to be seated on the first valve seat 1b provided in the valve seat member 1. Other elements of the damping valve V2 are similar to those of the damping valve V. Therefore, their descriptions will not be repeated while like reference numerals denote like elements.

In this manner, since the subsidiary valve body 2 is biased by the subsidiary valve body biasing means 50, it is possible to make it easy to return the subsidiary valve body 2 to the sitting position on the first valve seat 1b after the subsidiary valve body 2 opens the port 1a. In addition, since the subsidiary valve body biasing means 50 makes it easy to return the subsidiary valve body 2 even when the valve body 3 and the subsidiary valve body 2 are separated from each other, it is possible to prevent a delay in closing the port 1a when the shock absorber S expands or contracts frequently. Therefore, it is possible to further improve responsiveness for generating the damping force.

It is noted that the subsidiary valve body biasing means 50 may be formed of any elastic body such as a spring or rubber other than the disc spring if it can be configured such that the biasing force is exerted to return the subsidiary valve body 2 to the sitting position on the first valve seat 1b.

Figure 9:
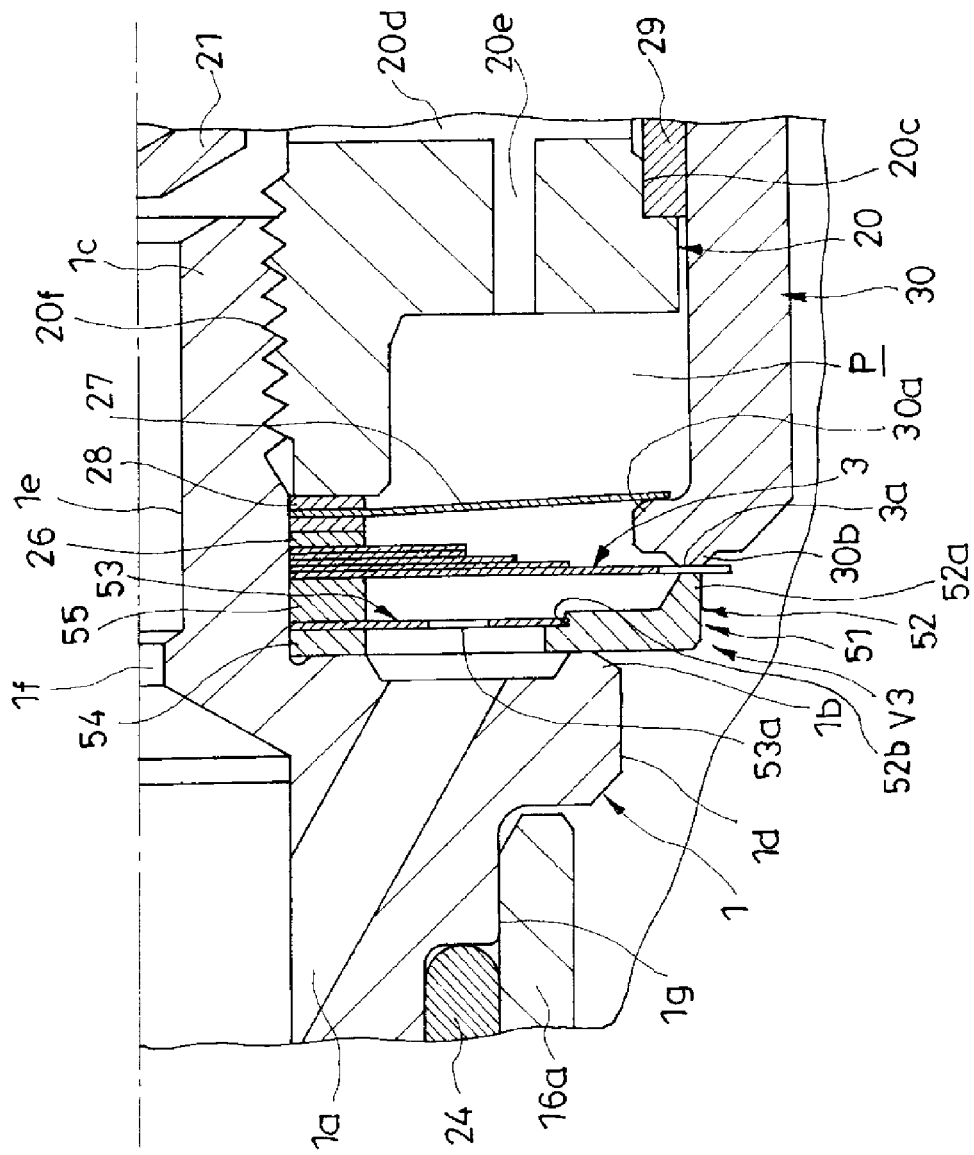
FIG. 9 is a partially enlarged cross-sectional view illustrating a damping valve according to still another embodiment of this invention.

In the damping valve V3 according to still another embodiment, the subsidiary valve body biasing means may be integrated into the subsidiary valve body 51 as illustrated in FIG. 9.

The subsidiary valve body 51 includes an annular outer ring portion 52 seated on or unseated from the first valve seat 1*b* and provided with a second valve seat 52*a*, and an annular inner ring portion 53 serving as the subsidiary valve body biasing means. Other elements of the damping valve V3 are similar to those of the damping valve V. Therefore, their descriptions will not be repeated while like reference numerals denote like elements.

The subsidiary valve body 51 is mounted to the outer circumference of the assembly shaft 1*c* of the valve seat member 1 via an inner ring portion 53 formed of a thin plate into the inner circumferential side. The inner ring portion 53 is configured such that its outer circumferential side can be freely flexed if its inner circumferential side is fixedly supported by the assembly shaft 1*c*. For this reason, in the damping valve V3, washers 54 and 55 are mounted to the assembly shaft 1*c* instead of the spacer 25 in order to hold the inner circumference of the inner ring portion 53 using the washers 54 and 55. In addition, the inner ring portion 53 is provided with a restrictive passage 53*a* serving as an orifice so as to cause the valve-body intermediate chamber C to communicate with the port 1*a*.

The outer ring portion 52 having an annular shape includes an annular second valve seat 52*a* provided in its outer circumference to protrude oppositely to the valve seat member 1, and an annular concave portion 52*b*, where the outer circumference of the inner ring portion 53 is fitted, provided in its inner circumference opposite to the valve seat member 1. The subsidiary valve body 51 is configured such that the outer ring portion 52 is positioned by the inner ring portion 53 in the radial direction so as not to be deviated.

In this manner, even when the inner ring portion 53 serving as a subsidiary valve body biasing means is integrated into the subsidiary valve body 51 itself, the subsidiary valve body 51 itself is biased by the inner ring portion 53, so that it is possible to make it easy to return the outer ring portion 52 to the sitting position on the first valve seat 1*b* after the outer ring portion 52 opens the port 1*a*. In addition, even when the valve body 3 is separated from the outer ring portion 52, the inner ring portion 53 makes it easy to return the outer ring portion 52. Therefore, it is possible to reliably prevent a delay in closing the port 1*a* when the shock absorber S expands or contracts frequently. In addition, it is possible to further improve responsiveness for generating a damping force.

Embodiments of the present invention were described above, but the above embodiments are merely examples of applications of the present invention, and the technical scope of the present invention is not limited to the specific constitutions of the above embodiments.

With respect to the above description, the contents of application No. 2013-050137, with a filing date of Mar. 13, 2013 in Japan, are incorporated herein by reference.

The invention claimed is:

1. A damping valve comprising:
    a valve seat member provided with a port;
    a valve body that opens or closes the port;
    a back-pressure chamber configured to bias the valve body toward the valve seat member using an internal pressure;
    a pilot passage configured to reduce a pressure upstream of the port and guide the pressure into the back-pressure chamber; and
    a pilot valve provided in the middle of the pilot passage, the pilot valve being configured to control the internal pressure of the back-pressure chamber,
    wherein the pilot valve has a pilot valve seat member and a pilot valve body,
    the pilot valve seat member having an cylindrical valve container provided with a penetrating hole connecting the inside and the outside, the penetrating hole communicating with the port, and an annular pilot valve seat provided in an end of the valve container, and
    the pilot valve body having a large diameter portion, a small diameter portion slidably inserted into the valve container, and a concave portion provided between the large diameter portion and the small diameter portion to face the penetrating hole, and
    an end of the large diameter portion is seated on or unseated from the pilot valve seat to open or close the pilot passage.

2. The damping valve according to claim 1, wherein the valve container has a bottomed cylindrical shape and forms a space along with the pilot valve body,
    the pilot valve body has a communicating channel communicating with one end to the other end, and an orifice provided in the middle of the communicating channel, and
    the space communicates with the outside via the communicating channel.

3. The damping valve according to claim 1, further comprising a failsafe channel branching from the pilot passage; and
    a failsafe valve provided in the middle of the failsafe channel,
    wherein the pilot valve is configured to block a side of the pilot passage downstream from a connection point to the failsafe channel when the pilot valve body is separated from the pilot valve seat at maximum.

4. The damping valve according to claim 1, wherein the pilot valve further has
    a pilot valve body biasing member configured to bias the pilot valve body to recede from the pilot valve seat, and
    a solenoid that exerts a thrust force such that the pilot valve body is seated on the pilot valve seat resisting to a biasing force of the pilot valve body biasing member.

5. The damping valve according to claim 1, wherein the valve seat member has a first valve seat that surrounds the port,
    the damping valve further comprising a subsidiary valve body seated on or unseated from the first valve seat, the subsidiary valve body having a second valve seat in a side opposite to the valve seat member,
    the valve body is seated on or unseated from the second valve seat and forms a valve-body intermediate chamber between the subsidiary valve body and the valve body in an inner circumferential side of the second valve seat,
    the damping valve further comprising a restrictive passage that causes the port and the valve-body intermediate chamber to communicate with each other, the restrictive passage being configured to apply resistance to a passing fluid flow, and
    the valve body and the subsidiary valve body are pressed by the internal pressure of the back-pressure chamber toward the valve seat member.

6. The damping valve according to claim 5, wherein the subsidiary valve body is floatably stacked on the valve seat member.

7. The damping valve according to claim 5, further comprising a subsidiary valve body biasing means configured to bias the subsidiary valve body toward the valve seat member.

8. The damping valve according to claim 5, wherein both the first and second valve seats have an annular shape, and an inner diameter of the second valve seat is set to be larger than that of the first valve seat.

9. The damping valve according to claim 5, wherein the restrictive passage is formed in the subsidiary valve body.

10. The damping valve according to claim 1, wherein the valve body is an annular leaf valve having an inner circumference fixed to the valve seat member and an outer circumference that can be flexed.

11. The damping valve according to claim 1, further comprising a tubular spool that abuts on a side of the valve body opposite to the valve seat member;
- a spool holding member having an outer circumference where the spool is mounted movably along an axial direction; and
- a ring mounted to the outer circumference of the spool holding member to make sliding contact with an inner circumference of the spool,
- wherein the back-pressure chamber is partitioned by the spool and the spool holding member, and
- the internal pressure of the back-pressure chamber is applied to an inner circumferential side of the ring.

12. The damping valve according to claim 11, wherein the ring has a bias cut.

* * * * *